Patented Jan. 6, 1925.

1,522,428

UNITED STATES PATENT OFFICE.

LLEWELLYN R. FERGUSON, OF LE ROY, NEW YORK, ASSIGNOR, BY MESNE ASSIGNMENTS, TO THE JELL-O COMPANY, INC., OF LE ROY, NEW YORK, A CORPORATION OF NEW YORK.

FOOD PRODUCT.

No Drawing.     Application filed June 22, 1922. Serial No. 570,202.

*To all whom it may concern:*

Be it known that I, LLEWELLYN R. FERGUSON, a citizen of the United States, residing at Le Roy, in the county of Genesee and State of New York, have invented new and useful Improvements in Food Product, of which the following is a specification.

The present invention relates to food product and the primary object is to provide a food product for diabetics or those suffering from other metabolic conditions in which carbohydrate should be omitted from the diet, which food product can be made in a dry granular form, thus facilitating its handling and keeping, and which will yield, by the simple addition of boiling water and cooling, a table jelly which will be appetizing and palatable, and which can be used as a wholesome food or dessert by persons afflicted with obesity, diabetes mellitus or glycuresis, the preparation being free of sugar or other constituents harmful to the patient, and having a relatively low protein content.

The food product, according to the present invention comprises the following ingredients:

1. Pure food gelatin, which may be of any of the commercial kinds capable of producing jellies when mixed with boiling water and cooled, even in the presence of acid, it being preferable to employ any gelatin of animal origin conforming in purity with the tests prescribed by the Bureau of Chemistry, U. S. Department of Agriculture.

2. Fruit acid, which may be either tartaric acid, citric acid or malic acid or a mixture of two of more of these acids.

3. A carbohydrate-free sweetener, comprising an intensely sweet coal-tar derivative such as saccharin, dulcin or glucin.

4. Color, which may comprise either—
   a. An acetone extract of turmeric;
   b. Carminic acid in hydro-alcoholic solution;
   c. Orcein in alcoholic solution;
   d. Chlorophyll in alcoholic solution;
   e. A mixture of any two or more of the above; or
   f. One of the so-called "certified food colors" in dry powdered form.

5. Flavor, comprising highly concentrated alcoholic or ethereal solutions of the flavoring principles of different fruits or synthetic flavors such as those on the market may be used.

The proportions of the different ingredients may be varied as desired or as circumstances may require. The amount of gelatin entering into a regular batch depends upon the jelly strength of the gelatin used, since commercial food gelatins vary widely in this property, and hence the proportion of gelatin used may be varied accordingly. The ratio between the fruit acid and sweetener depends upon the particular strength of fruity taste desired in the finished product. The proportion and kind of color is dependent on the special variety of finished product desired, e. g., whether the product is intended to be labelled a "lemon," "orange," or other flavored dessert. The proportion and kind of flavor used depends upon the special variety of the product, as desired. The following table gives typical proportions of the ingredients for average composition containing saccharin as a sweetener, it indicating the range of proportions permissible in an average commercial-size batch of the product.

|  | Average composition. | | Possible range, grams per unit package. | Percentage. | Average range, 1,130 unit package. |
| --- | --- | --- | --- | --- | --- |
|  | Grams per unit package. | Percentage. |  |  |  |
| Gelatin | 14.4 | 85.68 | 8 to 18 | 75 to 98 | 16.33 kilos. |
| Fruit acid | 2.2 | 13.10 | 0.0 to 3.0 | 0 to 38 | 2.50 kilos. |
| Saccharin | 0.2 | 1.19 | 0.1 to 0.2 | 0.5 to 2.5 | 0.23 kilos. |
| Color—natural or synthetic | 0.005 | 0.03 | 0.001 to 0.015 | 0.005 to 0.2 | Variable. |
| Flavor—pure fruit or synthetic | Indefinite. | Indefinite. | Indefinite | Indefinite | Variable. |
| Total | 16.8 | 100 | 8.1 to 21.2 |  | 19.06 kilos. |

When dulcin or glucin is used as a sweetener instead of saccharin, substantially the same proportions indicated in the table may be used.

The product may be prepared with the aid of any suitable apparatus, it being preferable to employ a receptacle provided with a revolving worm or other type of agitator for mixing. Weighed amounts of gelatin and fruit acid are introduced into the machine, after which the flavor is added to the mass either by atomizing, spraying or pouring while the worm is revolving, or if desired the flavor may be added subsequently, in admixture with liquid natural color. After the solvent for the flavor has dried off, leaving the flavor deposited on the mass, the color is incorporated. The color may be either one of the so-called "certified food colors," in which case it is added in dry powder form, or and as is preferable, a natural color in concentrated alcoholic, hydro-alcoholic or acetone solution, the particular solvent depending on the kind of color used, the natural color being added by atomizing, spraying or simply pouring on the mass. The liquid natural color, when used, may be mixed with the flavor before adding to the mass, as previously stated. In either case, the addition is made slowly and while the mass is being agitated, the mixing being continued until the solvent has nearly dried off. At this stage, the required weight of powdered sweetener is added. The mixing or agitation is then continued for several minutes to effect a thorough intermingling of the sweetener with the other ingredients. The finished product, which is then in a dry granular form, is ready for packing in containers.

The product is prepared for use as a food or dessert by dissolving the desired quantity in a suitable proportion of boiling water, (for example, about 17 grams in a pint of water) after which it is set away in a cool place to harden. The food or dessert is then ready to eat.

The present invention provides a food or dessert which is appetizing and palatable, yet is not harmful or injurious to persons suffering from obesity, diabetes mellitus or glycuresis, and it meets the metabolic needs of the patient. It is a satisfactory substitute for a fruit jelly, gelatin taking the place of pectin, and saccharin, dulcin and glucin taking the place of sugar or other carbohydrates. Moreover, the improved food product or dessert is low in protein content which is of importance in the dieting of diabetics and is now being emphasized in the treatment of the disease. Gelatin which constitutes the largest ingredient of the herein-described food product for diabetics or those suffering from glycuresis possesses the advantages that it functions as a true food, although having limited amounts of food elements available therein so that it provides a food of relatively large bulk. The effective protein content from a physiological standpoint of the jelly made from the mixture of gelatin with the other ingredients, is about 1.5 per cent which is equivalent substantially to that of grapes, onion, banana, and similar foods, so that its protein value is limited rather closely to the metabolic needs of the patient. The gelatin when combined with the other ingredients including saccharin, dulcin or glucin as sweeteners provides a food product which is palatable yet free of sucrose or other carbohydrates.

The improved food product in each instance has the practical advantages that it can be easily prepared initially in dry granular form, which is convenient for packing, shipping and handling, and it can be easily and quickly prepared for use by simply adding boiling water in proper proportion to the desired amount of the product and allowing the same to cool and thus form a jelly, it being unnecessary to either boil or cook the product in preparing it for use.

I claim as my invention:—

1. A food product of the character described comprising gelatine carrying a carbohydrate-free sweetener, the product being in dry granular form and capable of yielding a jelly.

2. A carbohydrate-free food product comprising gelatine carrying saccharine and a fruit acid, the gelatine being capable of forming a jelly, in the presence of the acid, upon admixture of boiling water to the product and cooling.

In testimony whereof I have hereunto set my hand in presence of two subscribing witnesses.

LLEWELLYN R. FERGUSON.

Witnesses:
T. A. WILSON,
IRENE DILLON,